Oct. 6, 1936.     L. O. E. ROESSEL     2,056,369
LAWN MOWER
Filed July 16, 1935     2 Sheets-Sheet 1
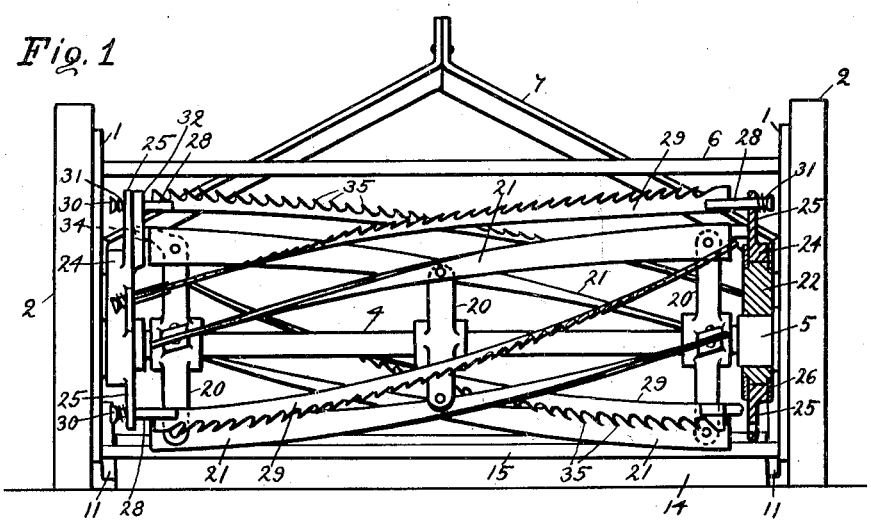
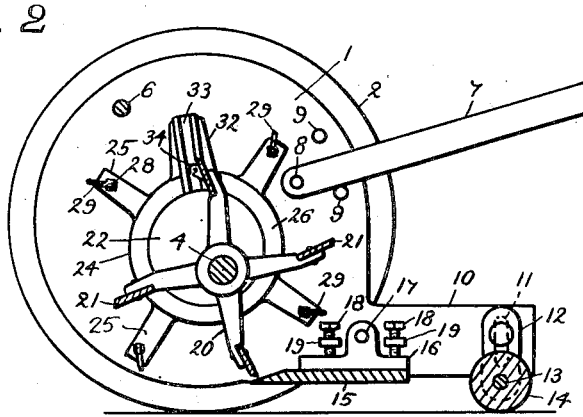
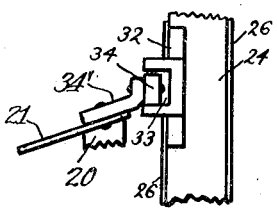
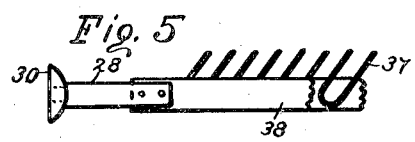
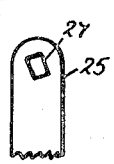
Louis Otto E. Roessel
INVENTOR
BY John P. Nixonow
ATTORNEY Oct. 6, 1936.  L. O. E. ROESSEL  2,056,369
LAWN MOWER
Filed July 16, 1935  2 Sheets-Sheet 2
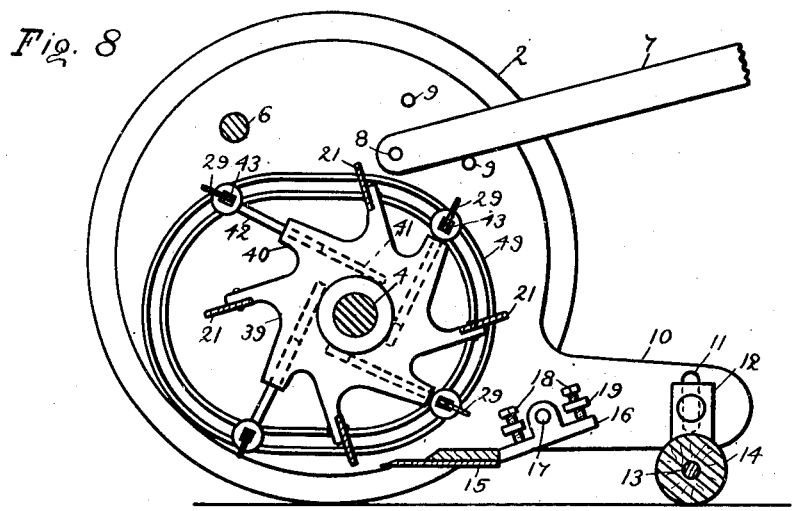
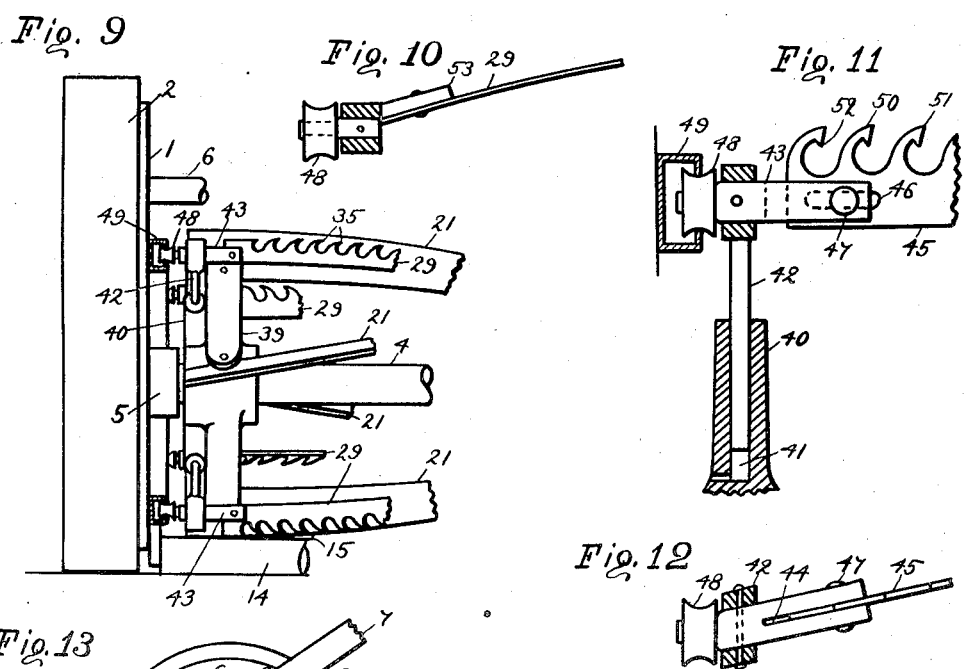
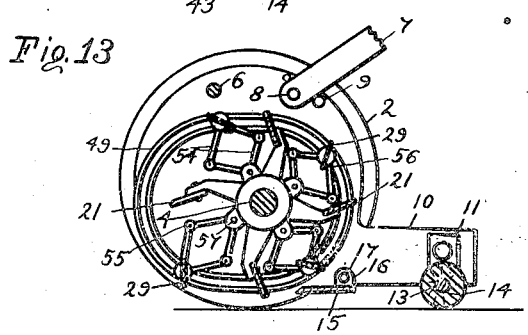
Louis Otto E. Roessel
INVENTOR
BY John P. Nixon
ATTORNEY Patented Oct. 6, 1936

2,056,369

UNITED STATES PATENT OFFICE 2,056,369

LAWN MOWER

Louis Otto E. Roessel, Chappaqua, N. Y.

Application July 16, 1935, Serial No. 31,570

8 Claims. (Cl. 56—294)

My invention relates to lawn mowers and has particular reference to mowers having rotary knives.

It is well known that ordinary lawn mowers with rotary knives can satisfactorily cut only relatively short grass which can be pulled by the knives against the bottom knife. Tall grass and weeds are merely deflected by the rotary knives and are passed over by the bottom knife without cutting them.

The object of my invention is therefore to provide a supplementary device for catching and dragging tall grass under the knives.

I have found that metal strips or blades with sharp hooks along their front edges, rotating between the knives and with them, are very effective for catching tall weeds by their stems and for bringing them down under the rotary knives where they meet the bottom knife.

The hooks are most effective for this purpose if they have sharp points directed forward and at an angle so as to enter between the weed stalks without deflecting them forward. The hooked shape of the point is necessary in order to retain the weeds by the inner portion of the hook until they are laid over the bottom knife.

In order to be effective, however, the blades with hooks must meet the grass ahead of the rotary knives but must be withdrawn back of the edges of the rotary knives before they meet the bottom knife. The weeders or hooked blades must therefore rotate eccentrically with respect to the axis of the knives.

For this purpose I provide eccentric hubs on the bearings of the knife shaft and separate spiders or wheels rotating on these hubs, the ends of the weeder blades being fastened to the arms of these spiders.

I also provide a sliding engagement between the knife spiders and the eccentric spiders in order to rotate the latter at the same speed as the knives.

I prefer to place the weeder blades in the spaces between the successive knives and parallel thereto. Because of the spiral arrangement of the knives and weeder blades and their eccentric rotation, it is also necessary to provide sliding and flexible joints at the points of support of the ends of the blades.

As a modification, I provide eccentric rails at the end brackets of the mower for guiding the ends of the blades, which are connected to the knife spiders by means of expansive arms.

My invention is more fully described in the accompanying specification and drawings in which—

Fig. 1 is a front view of my mower partly in section, Fig. 2 is a transverse section of the same, Fig. 3 is a detail view of the eccentric in section, Fig. 4 is a view of the end of the eccentric arm, Figs. 5 and 6 are views of a modified construction of the weeder blade, Fig. 7 is a detail view of a driving connection for the blades, Fig. 8 is a transverse section of a modified device, Fig. 9 is a partial front view of the same, Fig. 10 is a detail view of one modification of the end attachment of the weeder blade, Figs. 11 and 12 are views of another modification of the end mounting of the weeder blade, and Fig. 13 is a transverse section of another modification.

My lawn mower consists of end brackets 1 rotatively supporting end wheels 2. The latter have internal gears (not shown) connected through intermediate gears with pinions 3 on the ends of a shaft 4 journaled in bearings 5 in the brackets. The brackets 1 are connected together by a rod 6. A forked handle 7 is pivoted to the brackets at 8 and can be turned on the pivots between pins or projections 9.

The brackets 1 have rear extension 10 with slots 11 to which are bolted brackets 12 supporting a shaft 13 for a wooden roller 14. A bottom knife 15 is attached to brackets 16 pivotally mounted on pins 17. The position of the knife 15 in relation to the shaft 4 is regulated by screws 18 fitted in lugs 19 on the brackets 1.

The shaft 4 has spiders 20 supporting on their arms spiral rotary knives 21 adapted to cut grass against the bottom knife 15 when the mower is being rolled forward. Eccentric hubs 22 are mounted on the bearings 5 and fastened by screws 23. The eccentricity of these hubs is directed toward the front of the mower as shown in Fig. 2. Spiders 24 with arms 25 are rotatively mounted on the hubs 22 and are retained in their positions by side flanges or rings 26. The arms 25 have rectangular apertures 27 at their ends in which slide rectangular bars 28. These bars are attached to the ends of weeder blades 29. The outer ends of the bars 28 have round nuts 30. Springs 31 are placed on the bars between the arms 25 and the nuts 30. A lug 32 is provided on the spider 24 with a slot 33 for a roller 34, the latter being mounted on an extension 34' on the end of one of the arms of the spider 20. The slots 33 on both spiders 24 are displaced by an angle corresponding to the angle between the arms 25 and in the same direction in which the spiders 20 are skewed so that the blades 29 follow approximately the spiral shape of the knives 21. The arms 25 are located between the arms of the spiders 20 so that the blades 29 are also located between the knives 21. The apertures 27 are inclined as shown in order to incline or tilt the blades 29 in direction of rotation. The blades 29 have sharp teeth 35 alternately directed on the successive blades to the right and to the left. The centers of the spiders 24 are located in front of the axis of the shaft 4 so that the blades and the lugs 32 clear the stationary knife 15. The rollers 34 exert tangential pressure on the lugs 32 in the slots 33 thereby causing rotation of the spiders 24, sliding in the slots 33 in accordance with the eccentricity of the centers of the spiders 24 in relation to the axis of the shaft 4.

The gears in the wheels 2 and brackets 1 are made so that the knives 21 turn in the same direction in which the wheels are rolled. The spiders 24 are rotated on the hubs 22 by the rollers 34 on the spiders 20. Due to the eccentricity of the hub 22, the blades 29 in front of the mower extend farther than the knives 21 and can therefore catch taller grass than it is possible for the knives. Tall stalks which cannot go under the blades are caught by the teeth 35 of the blades and pulled down on the bottom knife 15 to be cut by the knives. In order to be more effective the teeth 35 have sharp points directed forward at an angle as shown so that they can easily enter between the grass stalks. They are further provided with recesses or pockets 36 in which the stalks are gathered to be bent down with the further movement of the blades. The teeth on the successive blades are directed to the right and to the left alternately in order to catch the stalks from both sides.

A modified construction of the blades is shown in Figs. 5 and 6. Here the teeth 37 are made of steel wires bent in U shape and clamped between the sides of a U-shaped bar 38. The wires are placed at an angle to the bar in order to render them more effective for catching the grass stalks.

A modified construction of my lawn mower is shown in Figs. 8 and 9. Here the end spiders 39 on the shaft 4 have additional arms 40 with tangentially arranged holes 41 for sliding plungers 42. Rods 43 are fastened in the ends of the plungers and are provided with slots 44 for the ends of the blades 45. The blades have slots 46 for pins 47. This arrangement permits certain variations in the length of the blades caused by their spiral shape and eccentric movement.

The rods 43 have rollers 48 on their outer ends. These rollers have concave surface on the periphery for sliding on the edges of a channel-shaped endless guiding rail 49. Each bracket 1 has such a rail attached to its inner side. The rails are oval in shape being concentric with the shaft 4 at the rear portion of the mower and extending forward at the front of the mower. The rollers during the rotation of the shaft 4 follow the rails and cause the plungers 42 to slide out of the holes 41 when they reach the front side of the mower. The blades accordingly extend in front of the knives in front of the mower and can effectively catch tall grass stalks. They recede again before approaching the bottom knife so as to clear the latter due to the telescopic arrangement of the plungers 42.

The teeth 50 of the blades 45 are provided with sharp points 51 (Fig. 11) directed forward at an angle and also with hooks 52 adapted to retain the grass stalks until they are laid over the bottom knife to be cut by the rotary knives.

The blades must be preferably made of steel strips as they are subjected to a certain amount of twist during their rotation. They need not be very stiff, however, as long as they do not come in contact with the knives.

Instead of providing sliding joints at their ends, the blades can be made expanding by giving them a certain curvature in their plane as shown in Fig. 10. This curvature allows for various degrees of stretching during the rotation of the blades. The blades 29 for this purpose are fastened to lugs 53 on the ends of the plungers 42.

Another modification is shown in Fig. 13. Here the telescopic plungers of the Figs. 8 and 9 are replaced by articulated levers 54 hingedly joined together at 55 and hingedly joined to the rods 43 and to the spider 24 at 56 and 57.

The links 54 form articulated parallelograms thereby permitting the end bars 43 and the blades to maintain the proper angles of inclination to the vertical.

I have found that the blades work most effectively when they are slightly inclined to the horizontal line at the point of first meeting the grass stalks, and when the blades turn nearly vertical at the points of approach to the bottom knife.

The blades need not exactly follow the curvature of the knives, and they may be placed substantially straighter than the blades in order to reduce the variations in length between their points of support at the opposite spiders.

It is understood that my lawn mower may be further modified in its construction without departing from the spirit of my invention.

I claim as my invention:

1. In a lawn mower having end brackets supported on wheels, a bottom knife supported on the brackets, a shaft with spiders journaled by its ends in the brackets, and rotary knives supported on the spiders, the combination of longitudinal weeder blades, means to movably support the ends of the blades on the brackets, operative connections between the spider and the blades, said blade supporting means being of an eccentric shape and adapted to advance the blades in front of the knives and to bring them back again so as to clear the stationary knife, the spiders being adapted to rotate the blades through the operative connections, each blade being continuously supported between two successive knives.

2. In a lawn mower having end brackets supported on wheels, a bottom knife supported on the brackets, a shaft journaled by its ends in the brackets, spiders on the shaft, and rotary knives supported on the spiders, the combination of cam-shaped members on the brackets, weeder blades movably supported by their ends on said members and extending between the knives, operative connections between the spiders and the blades adapted to transmit rotation to the blades, each blade being adapted to remain during rotation between two successive knives, the cam-shaped members being supported eccentrically to the shaft so as to bring the blades ahead of the knives in front of the mower and to move them back when approaching the stationary blade thereby clearing the latter.

3. In a lawn mower having end brackets supported on wheels, a bottom knife supported on the brackets, a shaft with spiders journaled by its ends in the brackets, and rotary knives supported on the spiders, the combination of weeder blades extending between the successive knives, means to movably support the ends of the blades on the brackets, operative connections between the spiders and the blades for rotating the blades with the knives, said blade supporting means being of an eccentric shape and adapted thereby to vary the distances of the blades from the axis of the shaft during their rotation so as to bring the blades farther away from the shaft in front of the mower and to bring them back to within clearing distance from the stationary knife, the blade supporting means being adapted to maintain each blade between the two successive knives during their rotation, and flexible expansive joints at the ends of the blades.

4. In a lawn mower having end brackets supported on wheels, a bottom knife supported on the brackets, a shaft with spiders journaled by its ends in the brackets, and rotary knives supported on the spiders, the combination of weeder blades, means to movably support the ends of the blades on the brackets, operative connections between the spiders and the blades adapted to transmit rotation to the blades, said blade supporting means being of an eccentric shape and adapted to bring the blades farther away from the shaft in front of the mower and to move them back so as to clear the stationary knife, and sliding hinged joints between the ends of the blades and said supporting means.

5. In a lawn mower having end brackets supported on wheels, a bottom knife supported on the brackets, a shaft with spiders journaled by its ends in the brackets, and rotary knives supported on the spiders, the combination of weeder blades extending longitudinally between the knives, means to movably support the ends of the blades on the brackets, operative connections between the spiders and the blades adapted to transmit rotation to the blades, said blade supporting means being of an eccentric shape and adapted to bring the blades radially in front of the knives at the front side of the mower and to move them back at the point of meeting the stationary knife, and hooked teeth on the outer edges of the blades, one side of each tooth being curved and terminating with a sharp point in front of the tooth, the other side receding inwardly and toward the curved side of the tooth and provided with a curved recess forming a hook.

6. In a lawn mower having end brackets supported on wheels, a bottom knife supported on the brackets, a shaft with spiders, bearings on the brackets for the ends of the shaft, eccentric hubs on the bearings, rotary knives supported on the spiders, secondary spiders rotatively mounted on the hubs, the arms of the secondary spiders being located between the arms of the primary spiders, weeder blades extending between the knives and supported by their ends on the arms of the secondary spiders, and lugs on the primary spiders operatively engaging the secondary spiders and adapted to transmit rotation to the secondary spiders, the centers of the hubs being located in front of the shaft so as to permit the blades to advance in front of the knives during rotation and to recede again for clearing the stationary knife.

7. In a lawn mower, the combination of end brackets supported on wheels, a bottom knife supported on the brackets, a shaft with spiders journaled by its ends in bearings in the brackets, hubs eccentrically mounted on the bearings, rotary knives supported on the spiders, secondary spiders rotatively mounted on the hubs, the arms of the secondary spiders being located between the arms of the primary spiders, weeder blades supported by their ends on the arms of the secondary spiders, the centers of the secondary spiders being located so as to bring the blades farther away from the shaft in front of the mower and to move them back at the stationary knife, and members on the spiders operatively engaging the secondary spiders so as to cause their rotation, said members being adapted to slide radially in relation to the secondary spiders in accordance with the eccentric rotation of the secondary spiders.

8. In a lawn mower, the combination of end brackets supported on wheels and supporting a bottom knife, a shaft journaled by its ends in the brackets, spiders on the shaft, rotary knives supported on the spiders, endless rails supported eccentrically around the shaft on the brackets, weeder blades slidably supported by their ends on the rails, and telescopic members on the spiders supporting the ends of the blades, the curvature of the rails and their position with reference to the shaft being such as to cause the blades to advance beyond the knives in front of the mower.

LOUIS OTTO E. ROESSEL.